United States Patent
Wu et al.

(10) Patent No.: US 12,527,879 B2
(45) Date of Patent: Jan. 20, 2026

(54) LIGANDS TARGETED TO EPIDERMAL GROWTH FACTOR RECEPTORS AND COMPOSITIONS FOR USE IN TREATING TUMORS

(71) Applicant: Academia Sinica, Taipei (TW)

(72) Inventors: Han-Chung Wu, Taipei (TW); Yi-Ping Wang, Taipei (TW); I-Ju Liu, Taipei (TW); Meng-Jhe Chung, New Taipei (TW)

(73) Assignee: ACADEMIA SINICA, Taipei (TW)

( * ) Notice: Subject to any disclaimer, the term of this patent is extended or adjusted under 35 U.S.C. 154(b) by 1080 days.

(21) Appl. No.: 17/616,002

(22) PCT Filed: May 31, 2020

(86) PCT No.: PCT/US2020/035486
§ 371 (c)(1),
(2) Date: Dec. 2, 2021

(87) PCT Pub. No.: WO2020/247290
PCT Pub. Date: Dec. 10, 2020

(65) Prior Publication Data
US 2022/0313840 A1    Oct. 6, 2022

Related U.S. Application Data

(60) Provisional application No. 62/857,163, filed on Jun. 4, 2019.

(51) Int. Cl.
*A61K 47/69* (2017.01)
*A61K 47/68* (2017.01)
*A61P 35/00* (2006.01)
*C07K 16/28* (2006.01)

(52) U.S. Cl.
CPC ...... *A61K 47/6913* (2017.08); *A61K 47/6849* (2017.08); *A61P 35/00* (2018.01); *C07K 16/286* (2013.01); *C07K 2317/21* (2013.01); *C07K 2317/622* (2013.01); *C07K 2317/77* (2013.01)

(58) Field of Classification Search
CPC . A61K 47/6849; A61K 47/6851; A61P 35/00; C07K 2317/622; C07K 14/71; C07K 2317/565; C07K 2319/30; C07K 16/2863
See application file for complete search history.

(56) References Cited

U.S. PATENT DOCUMENTS

2014/0079705 A1    3/2014  Hsieh et al.
2016/0102150 A1    4/2016  Sexton et al.

OTHER PUBLICATIONS

Malam et al. Trends Pharmacol Sci. Nov. 2009;30(11):592-9. (Year: 2009).*
International Search Report for PCT/US2020/035486, dated Sep. 21, 2020.
Written Opinion of International Search Authority for PCT/US2020/035486, dated Sep. 21, 2020.

* cited by examiner

*Primary Examiner* — Jeffrey Stucker
*Assistant Examiner* — Sarah Cooper Patterson
(74) *Attorney, Agent, or Firm* — Hsiu-Ming Saunders; INTELLECTUAL PROPERTY CONNECTIONS, INC.

(57) ABSTRACT

The present application relates to ligands targeted to epidermal growth factor receptor (EGFR) and compositions for use in treating tumors. Specifically, a ligand targeted to EGFR is disclosed. The ligand comprises a heavy chain variable domain and a light chain variable domain. The ligand may be selected from the group consisting of a single chain variable fragment, a fusion protein, a monoclonal antibody, and an antigen-binding fragment thereof. The ligand may be conjugated to a liposome or a nanoparticle that encapsulates at least one chemotherapeutic agent to form a ligand-targeted liposomal or nanoparticle drug. Also disclosed are conjugates and formulations for use in treating tumors such as squamous cell carcinoma of head and neck. A method for making a ligand-targeted liposomal drug is also disclosed. The drug may be a chemotherapeutic agent selected from the group consisting of doxorubicine and vinorelbine.

20 Claims, 8 Drawing Sheets
Specification includes a Sequence Listing.

VH, SEQ ID NO: 7

1 E V Q L V E S G G G L V Q P G G S L R L

21 S C <u>A A S G F N L S</u> S F W M S W V R Q A
VH CDR1, SEQ ID NO: 1

41 P G K G L <u>E W V A N I N H D</u> G S D K Y Y
VH CDR2, SEQ ID NO: 2

61 V D S V K G R F S I S R D N T K N S V Y

81 L Q M D S L R G E D T A V Y Y C <u>A K G K</u>
VH CDR3, SEQ ID NO: 3

101 <u>S L Y D G S A L D M</u> W G Q G T M V T V S
VH CDR3 (continued)

FIG. 8

VL, SEQ ID NO: 8

1 D I V M T Q S P S T L S A S V G D R V T

21 I T C <u>R A S Q T I</u> G R W L A W Y Q Q K P
VL CDR1, SEQ ID NO: 4

41 G K A P <u>K L L I Y G A</u> S S L Q S G V P S
VL CDR2, SEQ ID NO: 5

61 R F S G S G S G T D F T L T I S S L Q P

81 E D F A T Y Y C <u>Q Q S Y S T L W T</u> F G Q
VL CDR3, SEQ ID NO: 6

```
  1 GAGGTGCAGCTGGTGGAGTCTGGGGGAGGCTTGGTCCAGCCTGGGGGGTCCCTGAGACTC
  1  E  V  Q  L  V  E  S  G  G  G  L  V  Q  P  G  G  S  L  R  L
 61 TCCTGTGCAGCCTCTGGATTTAACCTTAGTAGCTTTTGGATGAGTTGGGTCCGCCAGGCT
 21  S  C  A  A  S  G  F  N  L  S  S  F  W  M  S  W  V  R  Q  A
121 CCAGGGAAGGGGCTGGAGTGGGTGGCCAACATAAACCACGATGGAAGTGACAAGTACTAT
 41  P  G  K  G  L  E  W  V  A  N  I  N  H  D  G  S  D  K  Y  Y
181 GTGGACTCTGTGAAGGGCCGATTCAGCATCTCCAGAGACAACACCAAGAATTCAGTGTAT
 61  V  D  S  V  K  G  R  F  S  I  S  R  D  N  T  K  N  S  V  Y
241 CTGCAAATGGACAGCCTGAGAGGCGAGGACACGGCTGTGTATTACTGTGCGAAAGGTAAA
 81  L  Q  M  D  S  L  R  G  E  D  T  A  V  Y  Y  C  A  K  G  K
301 TCGCTGTATGACGGCAGCGCTCTTGATATGTGGGGCCAAGGGACAATGGTCACCGTCTCT
101  S  L  Y  D  G  S  A  L  D  M  W  G  Q  G  T  M  V  T  V  S
361 TCAGGTGGAGGCGGTTCAGGCGGAGGTGGCTCTGGCGGTGGCGGATCGGACATCGTGATG
121  S  G  G  G  G  S  G  G  G  G  S  G  G  G  G  S  D  I  V  M
421 ACCCAGTCTCCTTCCACCCTGTCTGCATCTGTAGGAGACAGAGTCACCATCACTTGCCGG
141  T  Q  S  P  S  T  L  S  A  S  V  G  D  R  V  T  I  T  C  R
481 GCCAGTCAGACTATTGGTAGGTGGTTAGCCTGGTATCAGCAGAAACCAGGGAAAGCCCCT
161  A  S  Q  T  I  G  R  W  L  A  W  Y  Q  Q  K  P  G  K  A  P
541 AAGCTCCTGATCTATGGTGCATCGAGTTTGCAAAGTGGGGTCCCATCAAGGTTCAGTGGC
181  K  L  L  I  Y  G  A  S  S  L  Q  S  G  V  P  S  R  F  S  G
601 AGTGGATCTGGGACAGATTTCACTCTCACCATCAGCAGTCTGCAACCTGAAGATTTTGCA
201  S  G  S  G  T  D  F  T  L  T  I  S  S  L  Q  P  E  D  F  A
661 ACTTACTACTGTCAACAGAGTTACAGTACCCTGTGGACCTTCGGCCAAGGGACCAAGCTG
221  T  Y  Y  C  Q  Q  S  Y  S  T  L  W  T  F  G  Q  G  T  K  L
721 GAGATCAAACGT
241  E  I  K  R
``` aa sequence: SEQ ID NO: 9,
nt sequence: SEQ ID NO: 10,
underlined aa sequence: SEQ ID NO: 11

LIGANDS TARGETED TO EPIDERMAL GROWTH FACTOR RECEPTORS AND COMPOSITIONS FOR USE IN TREATING TUMORS

REFERENCE TO RELATED APPLICATION

This application is a national stage application (under 35 U.S.C. 371) of PCT/US2020/035486 filed on 31 May 2020, which claims priority to U.S. provisional application 62/857,163 filed on 4 Jun. 2019, all of which are herein incorporated by reference in their entireties

FIELD OF THE INVENTION

The present invention relates generally to a cancer therapy and more specifically to treatment of squamous cell carcinoma of head and neck.

BACKGROUND OF THE INVENTION

Squamous cell carcinoma of head and neck (SCCHN) arises from the lining mucosa of the oral cavity, oropharynx, hypopharynx or larynx. This malignancy is the fifth most prevalent cancer worldwide. Many patients with SCCHN are diagnosed with advanced stages (stage III to IVB). It is difficult to denote clear three-dimensional tumor margins due to the complex anatomy of the head and neck and the abundance of adjacent vital structures. Regional lymph node involvement is also a common feature of SCCHN and found in two-thirds of cases. The five-year overall survival (OS) rate for SCCHN is 50-60%. Despite advances in multi-disciplinary treatment, the risk of locoregional relapse is 60% and distant metastasis risk is 30%. In addition, the SCCHN survivors have a risk of developing second primary tumors along the aerodigestive tract.

Conventional cytotoxic chemotherapy is an indispensable pillar of SCCHN treatment regimens. Adjuvant chemotherapy is warranted by positive surgical margins and extracapsular spread of metastatic nodes. The major first-line chemotherapeutic regimen for SCCHN is platinum-based doublet therapy with fluoroucil or taxane. These therapies produce a 30% response rate and are only suitable for patients with good performance scores. Vinorelbine, a semi-synthetic microtubule-targeting *vinca* alkaloid, is indicated for treatment of metastatic SCCHN when the patient performance score is borderline.

Therefore, it is desirable to maximize treatment efficacy while simultaneously minimizing collateral toxicity.

SUMMARY OF THE INVENTION

In one aspect, the invention relates to a ligand targeting to epidermal growth factor receptor (EGFR), comprising:
(a) a heavy chain variable domain ($V_H$), comprising $V_H$ CDR1, $V_H$ CDR2, and $V_H$ CDR3, wherein the $V_H$ CDR1, $V_H$ CDR2 and $V_H$ CDR3 comprise the amino acid sequences of SEQ ID NO: 1, SEQ ID NO: 2, and SEQ ID NO: 3, respectively; and
(b) a light chain variable domain ($V_L$), comprising $V_L$ CDR1, $V_L$ CDR2, and $V_L$ CDR3, wherein the $V_L$ CDR1, $V_L$ CDR2, and $V_L$ CDR3 comprise the amino acid sequences of SEQ ID NO: 4, SEQ ID NO: 5, and SEQ ID NO: 6, respectively.

In one embodiment, the $V_H$ comprises the amino acid sequence of SEQ ID NO: 7 and the $V_L$ comprises the amino acid sequence of SEQ ID NO: 8.

In another embodiment, the ligand comprises the amino acid sequence of SEQ ID NO: 9.

The ligand may further comprise a peptide linking the $V_H$ to the $V_L$.

In one embodiment, the ligand is selected from the group consisting of a single chain variable fragment (scFv), a fusion protein, and a monoclonal antibody or an antigen-binding fragment thereof.

In one embodiment, the ligand is an antigen-binding fragment targeting to EGFR.

In one embodiment, the antigen-binding fragment targeting to the EGFR comprises the amino acid sequence of SEQ ID NO: 9.

In another aspect, the invention relates to a conjugate comprising: (a) a ligand of the invention; and (b) a liposome or a nanoparticle conjugated to the ligand.

In one embodiment, the liposome or nanoparticle is conjugated with polyethylene glycol (PEG) forming a PEGylated liposome or a PEGylated nanoparticle.

In another embodiment, the conjugate may further comprise at least one chemotherapeutic agent encapsulated within the liposome or nanoparticle. The at least one chemotherapeutic compound may be selected from the group consisting of doxorubicin and vinorelbine.

In another aspect, the invention relates to use of a conjugate disclosed above in the manufacture of a medicament for treating an EGFR-expressing tumor in a subject in need thereof. Further in another aspect, the invention relates to use of a conjugate disclosed above in the manufacture of a medicament for treating squamous cell carcinoma in a subject in need thereof.

Further in another aspect, the invention relates to an expression vector, a phage, or a cell, comprising and/or expressing a ligand of the invention.

In one embodiment, the ligand is a scFv with the $V_H$ being located at N-terminal or at C-terminal.

In one embodiment, the ligand is a scFv with the $V_H$ located at N-terminal to the $V_L$ and linked to the $V_L$, via a linker peptide.

In another embodiment, the ligand is a scFv with the $V_L$ located at N-terminal to the $V_H$ and linked to the $V_H$ via a linker peptide.

Further in another aspect, the invention relates to a pharmaceutical composition comprising (a) the conjugate as disclosed above; and (b) a pharmaceutically acceptable carrier.

Further in another aspect, the invention relates to a pharmaceutical composition comprising:
(a) an epidermal growth factor receptor (EGFR)-targeting conjugate; and
(b) a pharmaceutically acceptable carrier;
wherein:
the EGFR-targeting conjugate comprises a single-chain variable fragment (scFv) that is conjugated to a PEGylated liposome or a PEGylated nanoparticle, the scFv comprising a heavy chain variable region ($V_H$) and a light chain variable region ($V_L$);
further wherein:
(i) the $V_H$ comprises the amino acid sequence of SEQ ID NO: 7 and the $V_L$ comprises the amino acid sequence of SEQ ID NO: 8; and
(ii) the PEGylated liposome or the PEGylated nanoparticle encapsulates at least one chemotherapeutic agent.

Yet in another aspect, the invention relates to a method of making a ligand targeted liposomal or nanoparticle drug, comprising:

(a) affording a PEGylated liposome or a PEGylated nanoparticle;
(b) encapsulating the at least one chemotherapeutic agent within the PEGylated liposome or the PEGylated nanoparticle to obtain a PEGylated liposomal drug or a PEGylated nanoparticle drug;
(c) reducing a ligand as claimed in claims 1 to 5 to obtain a reduced ligand;
(d) inserting a PEGylation reagent with a 1,2-Distearoyl-sn-glycero-3-phosphorylethanolamine (DSPE) phospholipid and a maleimide into the PEGylated liposomal drug or the PEGylated nanoparticle drug to afford a maleimide-PEG-DSPE-inserting liposomal drug or a maleimide-PEG-DSPE-inserting nanoparticle drug;
(e) conjugating the reduced ligand to the maleimide-PEG-DSPE-inserting liposomal drug or to the maleimide-PEG-DSPE-inserting nanoparticle drug to obtain the ligand targeted liposomal or nanoparticle drug.

Yet in another aspect, the invention relates to use of a conjugate according to the invention in the manufacture of a medicament for treating a squamous cell carcinoma in a subject in need thereof.

BRIEF DESCRIPTION OF THE DRAWINGS

FIG. 7 shows the amino acid sequences of heavy chain variable domain ($V_H$, SEQ ID NO: 7) and $V_H$ CDR1 (SEQ ID NO: 1), $V_H$ CDR2 (SEQ ID NO: 2), and $V_H$ CDR3 (SEQ ID NO: 3)).

FIG. 8 shows the amino acid sequences of light chain variable domain ($V_L$, SEQ ID NO: 8) and $V_L$ CDR1 (SEQ ID NO: 4), $V_L$ CDR2 (SEQ ID NO: 5), and $V_L$ CDR3 (SEQ ID NO: 6).

FIG. 9 shows the amino acid (SEQ ID NO: 9) and DNA sequences (SEQ ID NO: 10) of whole scFv and the linker (the underlined, SEQ ID NO: 11) that connects the heavy chain variable domain and light chain variable domain.

DETAILED DESCRIPTION OF THE INVENTION

Definitions

Figure 1:
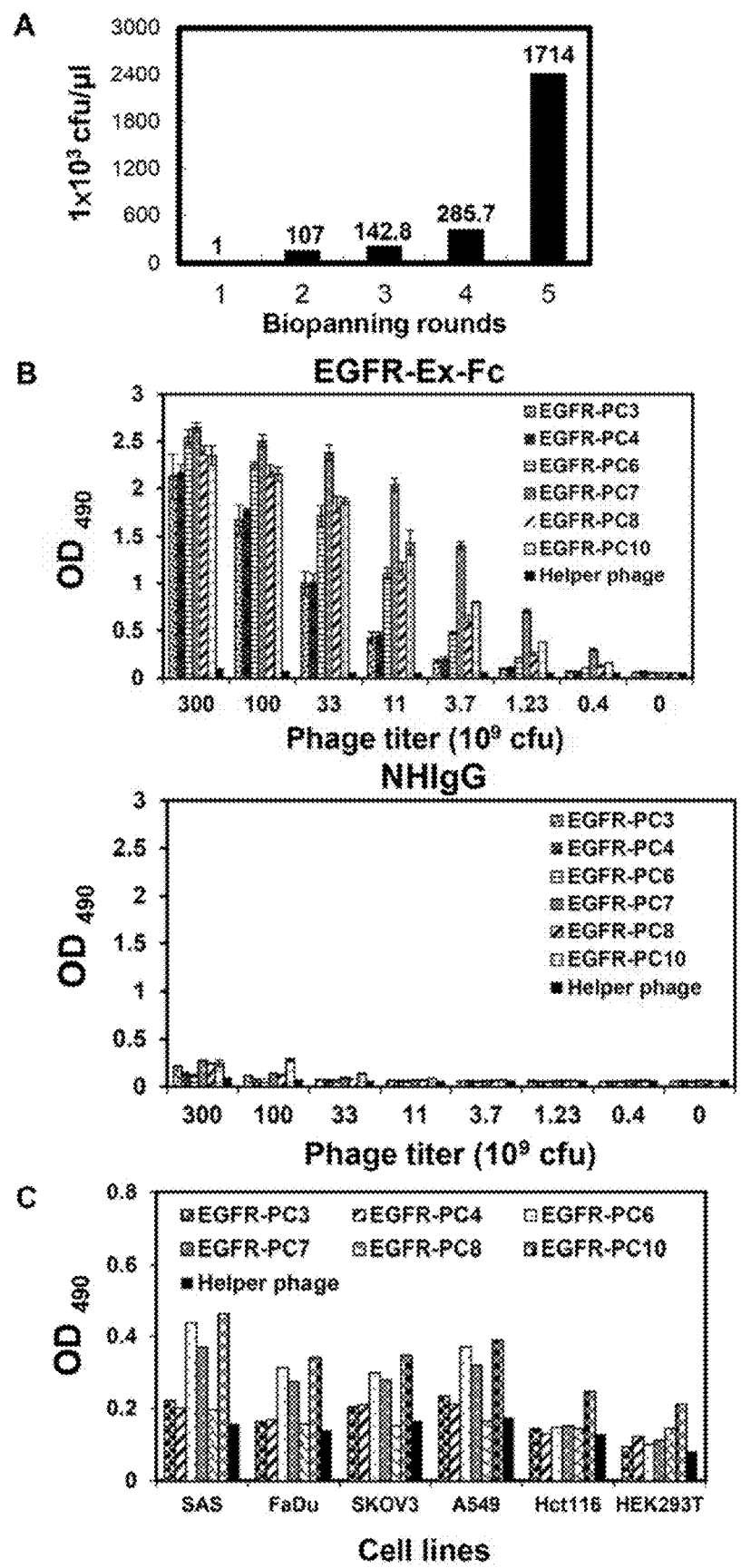
FIG. 1 shows selection and identification of human scFv phage clones that bind EGFR protein. (A) A bar graph illustrating the titer of EGFR-binding phages continuously elevated and enriched through biopanning rounds. (B) Bar graphs illustrating all of immunopositive scFv phage clones binding to EGFR-Ex-Fc protein in a dose-dependent manner (upper panel) but not normal human IgG (NHIgG, lower panel), as assayed by ELISA. (C) A bar graph comparing the affinities of the phage clones in binding to endogenous cellular EGFR in various cancer cell lines evaluated by ELISA.

The term "treating" or "treatment" refers to administration of an effective amount of a therapeutic agent to a subject in need thereof. Such a subject can be identified by a health care professional based on results from any suitable diagnostic method.

"An effective amount" refers to the amount of an active compound that is required to confer a therapeutic effect on the treated subject. Effective doses will vary, as recognized by those skilled in the art, depending on route of administration, excipient usage, and the possibility of co-usage with other therapeutic treatment.

The terms "ligand-targeting" and "ligand-targeted" are interchangeable.

The term "EGFR-s10" shall refers to a soluble scFv generated from a phage clone named EGFR-PC10.

The teen "a nanoparticle drug" shall general mean "a drug encapsulated nanoparticle".

The terms "chemotherapeutic compound", "chemotherapeutic agent", and "chemotherapeutic drug" are interchangeable.

The "Guidance for industry and Reviewers Estimating the Safe Starting Dose in Clinical Trials for Therapeutics in Adult Healthy Volunteers" published by the U.S. Department of Health and Human Services Food and Drug Administration discloses "a human equivalent dose" may be obtained by calculations from the following formula:

HED=Animal Dose in Mg/Kg×(Animal Weight in Kg/Human Weight in Kg)$^{0.33}$

As used herein, when a number or a range is recited, ordinary skill in the art understand it intends to encompass an appropriate, reasonable range for the particular field related to the invention.

Abbreviations: a single-chain variable fragment, scFv; diaminobenzidine hydrochloride, DAB; danger-associated molecular pattern, DAMP; drug delivery systems, DDS; epidermal growth factor receptor, EGFR; extracellular domain of EGFR, EGFR-Ex; isopropyl β-D-thiogalactopyranoside, IPTG; liposomal doxorubicine, LD; ligand-targeting liposomes, LTL; liposomal vinorelbine, LV; non-targeting liposomes, NTL; OPD: ortho-phenylenediamine; overall survival, OS; PBS containing 0.1% TWEEN® 20, $PBST_{0.1}$; polyethelene glycol, PEG; room temperature, RT; squamous cell carcinoma of head and neck, SCCHN; single chain variable fragment, scFv; Terrific Broth, TB; therapeutic payloads, TP; room temperature, RT.

The present application relates to a novel anti-EGFR human scFv-conjugated LTL with a payload of a chemotherapeutic agent such as doxorubicine, and vinorelbine. Both LTLs showed enhanced cytotoxicity over non-targeting liposomal counterparts in SCCHN cell lines in vitro. A sharper decrease in tumor volume and prolonged survival were observed after LTL treatment in NOD/SCID mice with subcutaneous or orthotopic xenografts of FaDu cells, without evident side effects in vivo.

Materials and Methods

Cell Lines

After screening EGFR expression by Western blotting, an HPV-negative oropharyngeal squamous cell carcinoma cell line (FaDu) and another gingival squamous cell carcinoma cell line (Ca9-22) were selected as experimental platforms. Both cell lines were cultured in recommended media and used within six months of continuous culture. The authenticity of all cell lines was confirmed by short tandem repeat (STR) profiling at BCRC, and *mycoplasma* contamination was monitored regularly by nested PCR.

Acquisition of Anti-EGFR Human scFv Phage Clones by Phage Display

A phage-displayed human naïve scFv library was created as previously described. The procedure of biopanning against the extracellular domain of human EGFR-Fc fusion protein (EGFR-Ex-Fc) is described below. The scFv library (initial titer of phage-displayed scFv library, $2\times10^{11}$ cfu) was incubated with protein G DYNABEADS to eliminate non-specific binding and subsequently reacted with recombinant EGFR-Ex-Fc (R&D system). Bound phages were retrieved by infecting TG1 strain of *Escherichia coli* after washing with PBS containing 0.1% TWEEN® 20 ($PBST_{0.1}$). The infected TG1 bacteria were serially diluted to determine the titer of phage clones, and the rest of the phage clones were rescued by M13K07 helper phages. Subsequent rounds of biopanning were performed on the rescued phage clones.

Selection of Anti-EGFR Human scFv Phage Clones by LUSA

We screened the binding capability of the enriched phage clones to EGFR using ELISA assay. EGFR-Ex-Fc fusion protein (1 µg/ml) in 0.1 M sodium bicarbonate was coated onto 96-well plates overnight at 4° C. The phage clones eluted from the fourth and fifth rounds of biopanning were randomly selected (total 476 clones) and added to the plates for 1 hr at room temperature (RI). The plates were supplemented with horseradish peroxidase (HRP)-conjugated mouse anti-M13 phage antibodies for 1 hr. After washing, a colorimetric reaction was initiated with ortho-phenylenediamine (OPD), and the 490-nm absorbance of the reaction product was measured with a microplate reader. The clones with OD-values above 1.0 were selected and sequenced.

In Vivo Horning Assay of Anti-EGFR Human scFv Phage Clones

Female Nod/SCID mice aged 8 to 10 weeks were inoculated subcutaneously (s.c.) with $2\times10^6$ FaDu cells in the flanks. After 21 days, the mice bearing size-matched tumors (300-500 mm) were injected with $2\times10^6$ cfu anti-EGFR scFv phages or control phages through the tail vein. After circulation for 8-10 min, the mice were sacrificed with $CO_2$ and perfused with 50 ml cold PBS to remove unbound phages. Brain, visceral organs (hearts, liver, kidney, spleen and lungs), and tumors were harvested, weighed and washed three times with cold PBS. The specimens were bisected. One half of each organ or tumor sample was homogenized for rescue of bound phage particles with ER2738 *E. Coli*. The titer of recovered phages was assessed on agar plates. The other half was embedded in OCT compound. Cryosections, 4 µm in thickness, were cut and used for immunohistochemical staining. The cryosections were dipped in PBS at 4° C. for 10 min. Paraformadehyde (1%) was applied to fix the tissue for 30 min. Following thorough rinsing in PBS three times, the endogenous peroxidase activity was quenched with 3% $H_2O_2$ (in methanol) for 30 min. Non-specific binding was blocked with 1% BSA for 30 min. Sections were incubated with monoclonal antibody against M13 (1:1000) for 1 hr at RT. After washing in PBST 0.1, sections were treated with polymer-based Super SENSITIVE™ IHC detection system. Sections were incubated with Super Enhancer reagent for 20 min at RT and thoroughly rinsed three times with $PBST_{0.1}$ for 5 min each. Sections were subsequently treated with Poly-HRP reagent for 30 min at RT. Diaminobenzidine hydrochloride (0.02%) containing 0.03% $H_2O_2$ was used as a chromogen to visualize peroxidase activity. The preparations were lightly counterstained with hematoxylin, mounted with PERMOUNT™ and examined by light microscopy.

Expression and Purification of Soluble Anti-EGFR Human scFv

The EGFR-s10 scFv sequence was ligated with the pFHC vector (contained flag, 6×His and cysteine tag) and transformed into HB2151 *E. coli*. After selection for transformed colonies, single colonies were incubated in Terrific Broth (TB) medium at 30° C. overnight. The overnight culture was diluted in TB medium and grown at 30° C. for 3 hr, until the *E. coli* reached mid-log phase ($OD_{600}$=0.6). The protein production was induced by isopropyl β-D-thiogalactopyranoside (1PTG) (0.4 mM) and sucrose (0.4 M) at 30° C. for 16 hr. After centrifugation, the bacteria pellets were resuspended in 200 ml PPE buffer (50 mM Iris, 1 mM EDTA and 20% sucrose, adjusted pH to 8.0). After centrifugation, the osmotic shock fluid was collected, and the periplasmic protein extraction was obtained by resuspending the pellets with iced 5 mM $MgSO_4$ followed by centrifugation to collect the supernatant. The mixture was sonicated to obtain total protein, filtered through 0.45 µm membranes and purified by a $Ni^+$-NTA SEPHAROSE t column and ANTI-FLAG® M2 column (SIGMA®). These purified scFv proteins were analyzed by reducing SOS-PAGE followed by COOMASSIE® blue staining and Western blot analysis using ANTI-FLAG® mAb.

Endocytosis Assay of Soluble EGFR-s10 scFv

Cells were incubated with EGFR-s10 for 30 min at 4° C. or 37° C. Following a PBS wash, the cells were fixed with 2% paraformaldehyde and permeabilized with 0.1% TRITON® X-100. Blocking was accomplished by adding 3% BSA. Mouse ANTI-FLAG antibodies were added to the cells and labeled with FITC anti-mouse IgG. Nuclei were stained with DAPI, and cells were observed on a confocal microscope (TCS-SP5, Leica).

Fabrication of EGFR-s10-conjugated LTLs and Lipo-SRB

PEGylated liposomes were prepared by a thin film method. Distearoylphosphatidylcholine, cholesterol, and mPEG2000-DSPE were dissolved and mixed in chloroform in optimal ratios, depending on the therapeutic payloads (TPs). Chloroform was then removed by evaporation. The lipid films were hydrated at 60° C. in ammonium sulfate or ammonium salts of 5-sulfosalicylic acid solution (depending on the TPs) and were extruded through polycarbonate membrane filters with a pore size of 0.1 μm using high-pressure extrusion equipment (LIPEX® Biomembranes) at 55° C. Drugs were encapsulated by a remote loading method at a concentration of 1 mg of doxorubicin and 3.5 mg of vinorelbine per 10 μmol of phospholipid to obtain liposomal doxorubicin (LD) and liposomal vinorelbine (LV), respectively. The final concentration of liposomes was estimated by phosphate analysis (Bartlett method). To obtain scFv-conjugated liposomal drugs, EGFR scFv was treated with 2 mM tris(2-carboxyethyl)phosphine (TCEP) to reduce intermolecular disulfide bonds at RT for 2 hr in a $N_2$ atmosphere. The reduced EGFR scFv was desalted with a NAP™-10 desalting column to remove TCEP and eluted by HEPES buffer (5 mM HEPES, 145 mM NaCl, 3.4 mM EDTA, pH 7.0). Incorporation of maleimide-carboxyl polyethylene glycol (Mr 2000)-derived distearoylphosphatidylethanolamine (Maleimide-PEG-DSPE) into PEGylated liposomal drugs was performed. Briefly, Maleimide-PEG-DSPE was dissolved in HEPES buffer and added to LD or LV at 0.5 mol of the liposome phospholipids. The mixture was incubated at 60° C. for 1 hr with gentle agitation. Subsequently, the reduced EGFR scFv was incubated with Maleimide-PEG-DSPE-inserting liposomes for conjugation at 4° C. overnight to generate an average of 60 scFv molecules per liposome. The conjugation reaction was terminated by 2-mercaptoethanol (2 mM of final concentration) to inactivate all unreactive maleimide groups. SEPHAROSE® 4B gel filtration chromatography was used to remove released free drugs, unconjugated scFv and unincorporated conjugates. Doxorubicin concentrations in the fractions of eluent were determined by measuring fluorescence at λEx-Em=485/590 nm using a spectrofluorometer (SPECTRAMAX® M5). Vinorelbine concentrations were determined by HPLC. The EGFR scFv-inserted liposomal drugs were separated by reducing SOS-PAGE, followed by staining with silver nitrate for estimation of conjugation efficiency. To generate lipo-SRB, Rh-DPPE-containing liposomes were fabricated with SPC:cholesterol:mPEG-DSPE in a molar ratio of SPC:cholesterol:mPEG-DSPE:Rh-DPPE 97:2:0.8:0.2. The EGFR-s10-lipo-SRB was then produced through PEGylation and subsequent conjugation of EGFR-s10 to lipo-SRB as previously described.

Characterization of EGFRs 10-conjugate LTLs

The average particle size of liposomes was determined by dynamic light scattering (DLS) at 25° C. using Malvern Zetasizer Nano ZS (Malvern instruments) with a 633-nm laser and a detection angle of 90°. The zeta-potential of the liposomes was measured using laser Doppler electrophoresis on the Malvern Zetasizer Nano ZS.

Internalization Assay of EGFR-s10-Conjugated LTLs

FaDu and Ca9-22 cells were incubated with anti-EGFR fully human scFv-conjugated LTLs and lipo-SRB for 30 min at 4° C. and 37° C. After washing with PBS, cells were fixed with paraformaldehyde (4%), permeabilized with TRITON® X-100 (0.1%) and blocked with 3% BSA. Mouse anti-M13 antibodies were added to the cells and labeled with FITC anti-mouse IgG. Nuclei were stained with DAPI and the cells were observed on a confocal microscope (TCS-SP5, Leica).

In vitro cytotoxicity assay of EGFR-s10-Conjugated LTLs

FaDu and Ca9-22 cells were incubated with various concentrations of non-targeted liposomal drugs, or EGFR-s10-conjugated LTLs for 4, 8, 16 and 24 hr. The medium was replaced with complete medium for 48 hr, and 4-[3-(4-iodophenyl)-2-(4-nitrophenyl)-2H-5-tetrazolio]-1,3-benzene disulfonate (WST-1) was added at 0.5 mg/ml. After the cells were incubated for 3 hr at 37° C., the reaction products' absorbance at 440-nm was measured, and half maximal inhibitory concentrations ($IC_{50}$) were calculated.

In Vivo Murine Subcutaneous Xenograft Therapeutic Assay

FaDu and Ca9-22 cells were inoculated s.c. into the flanks of 8- to 10-week-old Nod-SCID mice ($1\times10^6$ cells/mouse). The diameters of the resulting tumors were measured twice per week, and tumor volume was calculated as follows: large diameter×(small diameter)²×0.52. When tumors reached a mean volume of 350 mm³, mice with similarly sized tumors were randomized into treatment cohorts (n=8 mice/group). Therapeutic regimens were injected intravenously (i.v.) as PBS, non-targeted liposomal drugs, or EGFR-s10 conjugated LTLs at 1 mg/kg, twice a week for 4 weeks, with a cumulative dose of 8 mg/kg for each group. The tumor volume was monitored twice a week. Premature death endpoints included weight loss greater than 5 g, inability to eat, or tumor volume exceeding 2000 mm³.

In Vivo Murine Orthotopic Xenograft Therapeutic Assay

Luciferase-expressing FaDu-Luc cells ($2\times10^5$ cells mixed with matrigel in 50 μl of PBS per mouse) were orthotopically injected into the floor of the mouth of Nod/SCID mice (8 to 10-week-old). Tumor growth was monitored twice weekly with an IVIS in vim imaging system (Caliper Life Sciences, Hopkinton, MA, USA) after intraperitoneal administration of luciferin at 150 mg/kg and the images were analyzed using LIVING IMAGE® software (Caliper Life Sciences). When tumors reached a mean volume of 75 mm³, mice with similarly sized tumors were randomized into treatment cohorts (n===6 mice/group). Individual groups were treated with PBS, FD (1 mg/kg)+FV (2 mg/kg), LD (1 mg/kg)+LV (2 mg/kg), or EGFR-s10-LD (1 mg/kg)+EGFR-s10-LV (2 mg/kg) twice a week for 8 total doses. The mice were subjected to the same analyses as described above.

Statistical Analysis

All comparisons between treatment groups and non-treated counterparts were performed by Student's t-test. A p-value of less than 0.05 was considered statistically significant for all tests.

Results

Acquisition and Characterization of Anti-EGFR Human scFv Phage Clones

To generate anti-EGFR human scFv clones for use as an LTL targeting moiety, we performed five rounds of biopanning for recombinant human EGFR-Ex-Fc with a phage-displayed human scFv library of $2\times10^{11}$ clones. Through the process, the titer of EGFR-binding phages was continuously elevated and enriched to 1,714-fold of the original titer at the end of the fifth round (FIG. 1A). We randomly selected 476 phage clones and interrogated their binding affinities to EGFR-Ex-Fc with ELISA. Seventy-nine clones demonstrated high binding to human EGFR but not to negative controls (BSA). After DNA sequencing, we identified 16 different sequences within the 79 immuno-positive phage clones, of which six demonstrated superior dose-dependent binding to EGFR-Ex-Fc (FIG. 1B) with undetectable reactivity to the negative control, normal human IgG (NHIgG). This result also excluded the possibility of Fc-binding clones within our candidate phages. Next, we examined if these phage clones could bind to endogenous EGFR in various human carcinoma cell lines using an ELISA assay after validating EGFR-expression status with Western blotting. Phage clone EGFR-PC10 exhibited a significantly higher binding signal with all six human cancer cells lines compared to helper phage (FIG. 1C). Thus, this clone was selected as a candidate targeting moiety for further development of LTLs.

EGFR-PC10 Phage Clone Preferentially Accumulated in Tumors In Vivo

Figure 2:
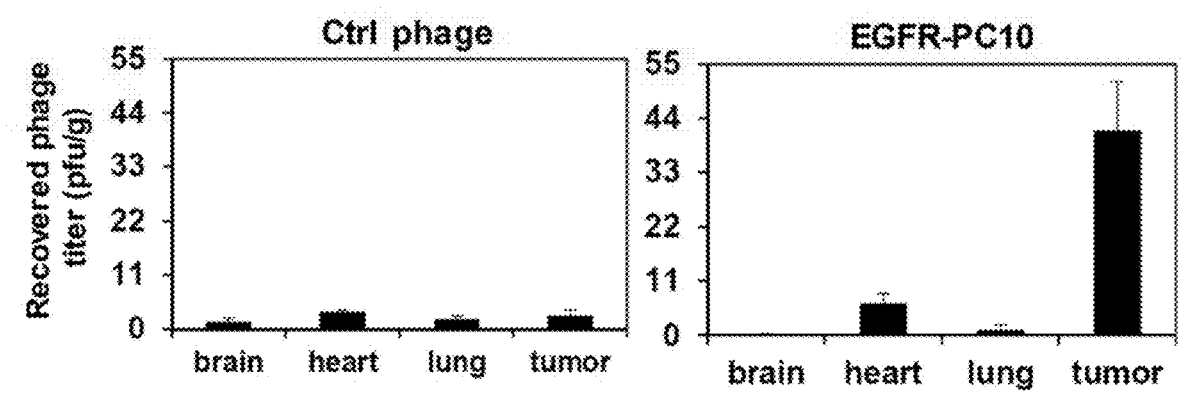
FIG. 2 shows identification of tumor-homing ability of an anti-EGFR scFv phage clone in a FaDu xenograft. (A) Bar graphs illustrating control phage (left panel) and EGFR-PC10 phage (right panel) distributions in vital organs and tumor tissues in the human oropharyngeal carcinoma FaDu xenografts-bearing mice after i.p. injection with respective phages indicated. The bound phages were recovered after perfusion, and phage titers in vital organs and tumor tissues were compared. (B) Photomicrographs illustrating the results of in sins detection of EGFR-PC10 phages by immunohistochemical staining. Scale bar: 100 μm.
Figure 2:
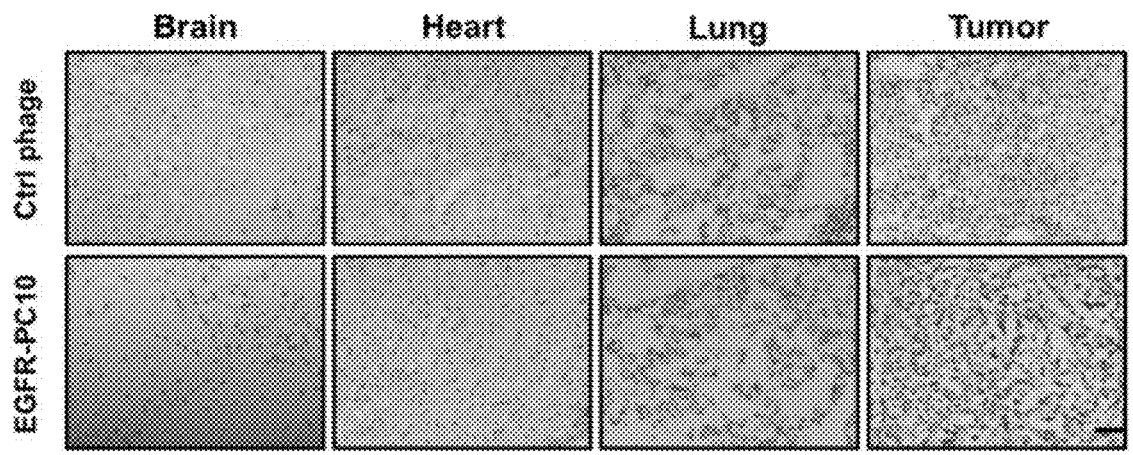

We examined the tumor-homing capability of phage clone EGFR-PC10 in vivo. Helper phages or EGFR-PC10 phages were injected i.v. into FaDu subcutaneous xenograft-bearing mice via tail vein. The EGFR-PC10 phages preferentially accumulated within the tumor xenografts compared to the vital organs (250-fold compared to brain and 33-fold compared to lung, FIG. 2A, right panel). The helper phages did not show differential distributions between the tumors and visceral organs (FIG. 2A, left panel). In situ detection of phage deposits was performed via immunohistochemical staining against phage M13. Enrichment of EFGR-PC10 phage was observed in tumor tissues rather than the normal organs in the EGFR-PC10 phage group. No phage positive signals were evident in tumor tissues or normal organs in the control phage group (FIG. 2B).

Examination of EGFR-s10 Internalization and Characterization of EGFR-s10-Conjugated LTLs We produced soluble scFv from EGFR-PC10 and designated it as EGFR-s10. Target binding and internalization are essential requirements of LTL-targeting moieties. We investigated these features of EGFR-s10 in SCCHN cancer cell lines. FaDu cells and Ca9-22 cells were separately incubated with EGFR-s10 at 4° C. or 37° C. for 30 min and compared with isotypic IgG controls. EGFR-s10 bound to the cell membrane of FaDu and Ca9-22 cells at 4° C. Internalization of EGFR-s10 (scFvs) as cytoplasmic aggregates was observed in both cell lines at 37° C. (FIGS. 3A-B).

To evaluate whether internalization and targeting were preserved after EGFR-s10 ligation to liposomes, we tested EGFR-s10-conjugated liposomal SRB in the SCCHN cell lines FaDu and Ca9-22 cells at 37° C. for 30 min (FIGS. 3C-D). No compromise of internalization capacity was discernable in either cell line compared to the previous soluble EGFR-s10. Enhanced cellular uptake was noted in the EGFR-s10-lipo SRB groups compared to the non-targeting lipo-SRB groups.

EGFR s10 recognized both human and marine EGFR-Ex-Fc. This feature eliminates any requirements for a surrogate molecule to evaluate toxicity in murine platforms. After validating internalization of EGFR-s10 in target cells, we fabricated LTLs loaded with doxorubicin or vinorelbine (EGFR-s10-LD and EGFR-s10-LV, respectively) using a thin film method and PEGylation of EGFR-s10. Table 1 lists physical parameters of LTLs. All LTL diameters were less than 150 μm and thus were not prone to clearance by the mononuclear phagocyte system. The zeta-potentials were all higher than required to prevent formation of aggregates. Our LTLs did not show enhanced uptake when treating EGFR-knockdown cells. In summary, EGFR-specific binding of EGFR-s10 was retained through chemical processing, and the resulting LTLs fulfilled the requirements of anti-neoplastic liposomal drugs, indicating suitability for further development.

TABLE 1

|  | Z-average (d · nm) | ζ-potential (mV) |
| --- | --- | --- |
| LD | 102.1 | −32.6 |
| LV | 103.6 | −24.5 |
| EGFR-s10-LD | 125 | −28.1 |
| EGFR-s10-LV | 115.2 | −29.2 |

Figure 4:
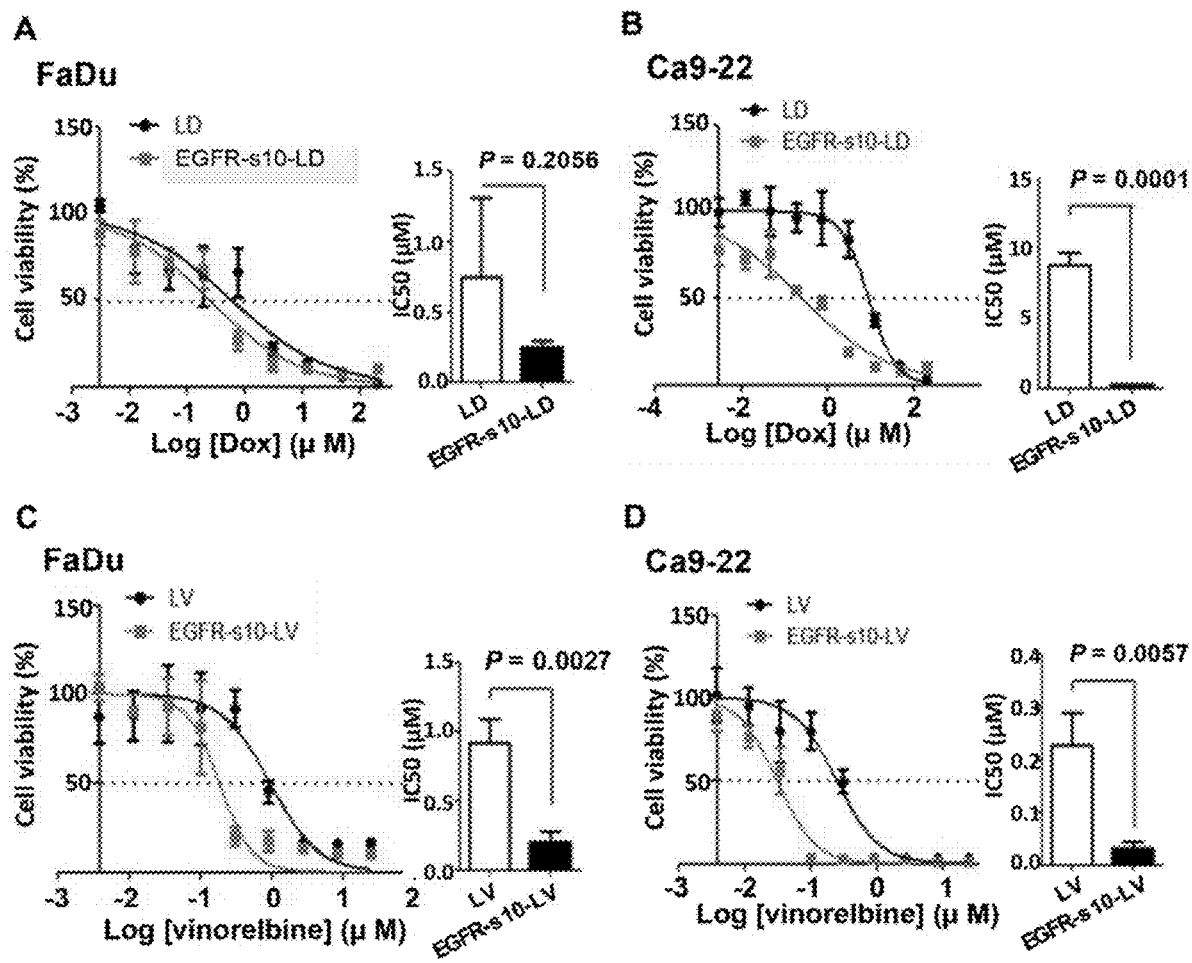
FIG. 4 shows EGFR-s10-targeted liposomes enhanced cytotoxic effects of doxorubicin and vinorelbine in human SCCHN cell lines. (A-D) Dose response curves (A-D, left panels) and IC50 bar graphs (A-D, right panels) of EGFR-s10 scFv-conjugated liposomal doxorubicine (EGFR-s10 LD, A & B) compared to unconjugated liposomal doxorubicine (LD, A & B), or EGFR-s10 scFv-conjugated liposomal vinorelbine (EGFR-s10-LV) compared to unconjugated liposomal vinorelbine (LV) in FaDu (A) and Ca9-22 (B) cells. Dashed lines indicate mean 50% viability. Each point represents the mean of three independent experiments

EGFR-s10-Conjugated LTLs Enhanced Cytotoxicity Compared to Non-Targeting Liposomes The cytotoxicity of EGFR-s10-conjugated LTLs was compared to that of non-targeting counterparts in human SCCHN cell lines. Cell viability was analyzed by the WST-1 assay and calculated as percentage of living cells. The EGFR-targeting LTLs with encapsulated doxorubicine and vinorelbine decreased the $IC_{50}$ in FaDu and Ca9-22 cells when compared to non-targeting liposomes (NTL) at all time-points examined (8-hr time-point, FIGS. 4B-D) except for 4 hr and 8 hr of liposomal doxorubicin in FaDu cells (FIG. 4A). The $IC_{50}$ values of EGFR-s10-LD and EGFR-s10-LV in FaDu cells were 0.33-fold (p=0.2056) and 0.21-fold (p=0.0027), respectively (FIGS. 4A and C). The reduction of $IC_{50}$ in Ca9-22 cells was even more prominent. The $IC_{50}$ of EGFR-s10-LD and EGFR-s10-LV in Ca9-22 cells was 0.0028-fold (p=0.0001) and 0.14-fold (p=0.0057), respectively (FIGS. 4B and D). To elucidate if the EGFR-s10 contributes to the anti-neoplastic capability of these LTLs, we assayed cytotoxicity of empty targeting liposomes without payloads of doxorubicin or vinorelbine. No evident cytotoxicity was observed in FaDu cells treated with empty EGFR-s10-conjugated liposomes in various concentrations (data not shown).

EGFR-s10-Conjugates LTLs Induced Faster Tumor Regression and Prolonged Overall Survival in Marine Subcutaneous and Orthotopic Xenograft Models Given the remarkable reduction in the $IC_{50}$ of the anti-neoplastic drugs in our LTL formulation in cancer cell lines, we tested the therapeutic efficacy in vivo in subcutaneously FaDu-xenografted Nod/SCID mice. Treatments were started when the tumor volume reached 350 mm³ by administering drugs 1 mg/kg, twice a week for 4 weeks with a cumulative dose of 8 mg/kg for each group. The group treated with combination of EGFR-s10-LD and EGFR-s10-LV (LTL) exhibited a significant decrease in tumor volume after the treatment (FIG. 5A-B) without obvious side effects (FIG. 5C).

Figure 5:
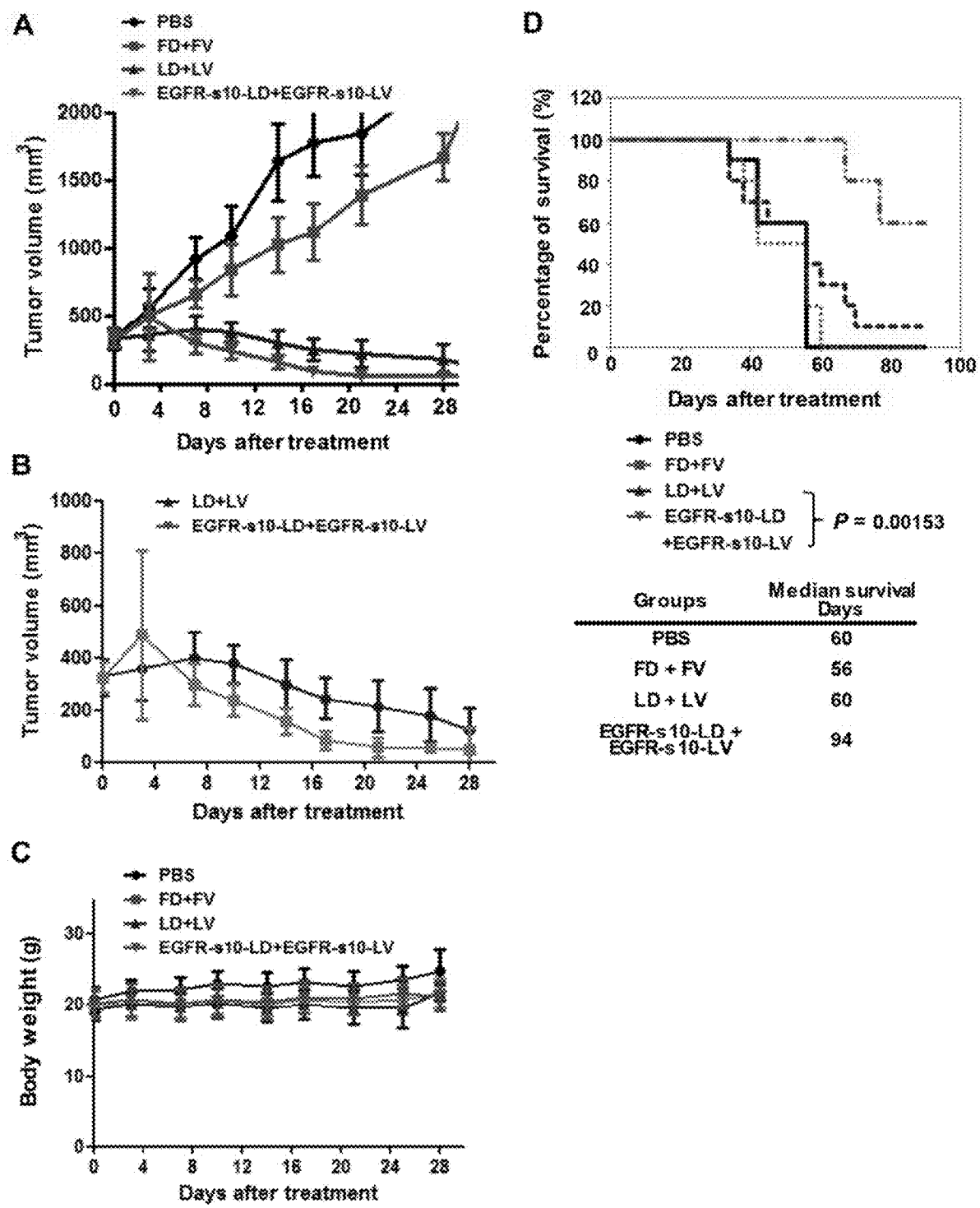
FIG. 5 shows therapeutic efficacy of EGFR-s10-conjugated LTLs in subcutaneous human SCCHN xenografts. (A) Tumor volumes of all four groups (n=8). Points, mean tumor volumes. (B) Comparison of tumor volume response profiles between LTL and NTL, groups. Points, mean tumor volumes. (C) Body weights of each group. (D) Kaplan-Meier survival curves (upper panel) and median survival time of all four groups (lower panel). Error bar, SE.

The average tumor volume in the LTL treated group was significantly smaller than that in the non-targeting liposome (NTL) treated group on day 7 and reached the lowest on day 21, whereas the tumor volume in the NTL group was at its nadir on day 28 after treatment (FIG. 5A-B). The LTL treatment confers a statistically significant survival advantage over the non-targeting liposome (p=0.00153) and the median survival time of LTL group was 1.5-times longer than that of NTL group (94 days versus 60 days, respectively; FIG. 5D, upper and lower panels). We also tested singlet vinorelbine treatment in forms of free drug, NTL or LTL, with a dose of 1.5 mg/kg twice a week for 4 weeks in subcutaneously Ca9-22-xenografted NOD/SCID mice. The mean tumor volume in the EGFR-s10-LV treated group was also smaller than that in the NTL vinorelbine, and no weight loss was observed.

Figure 6:
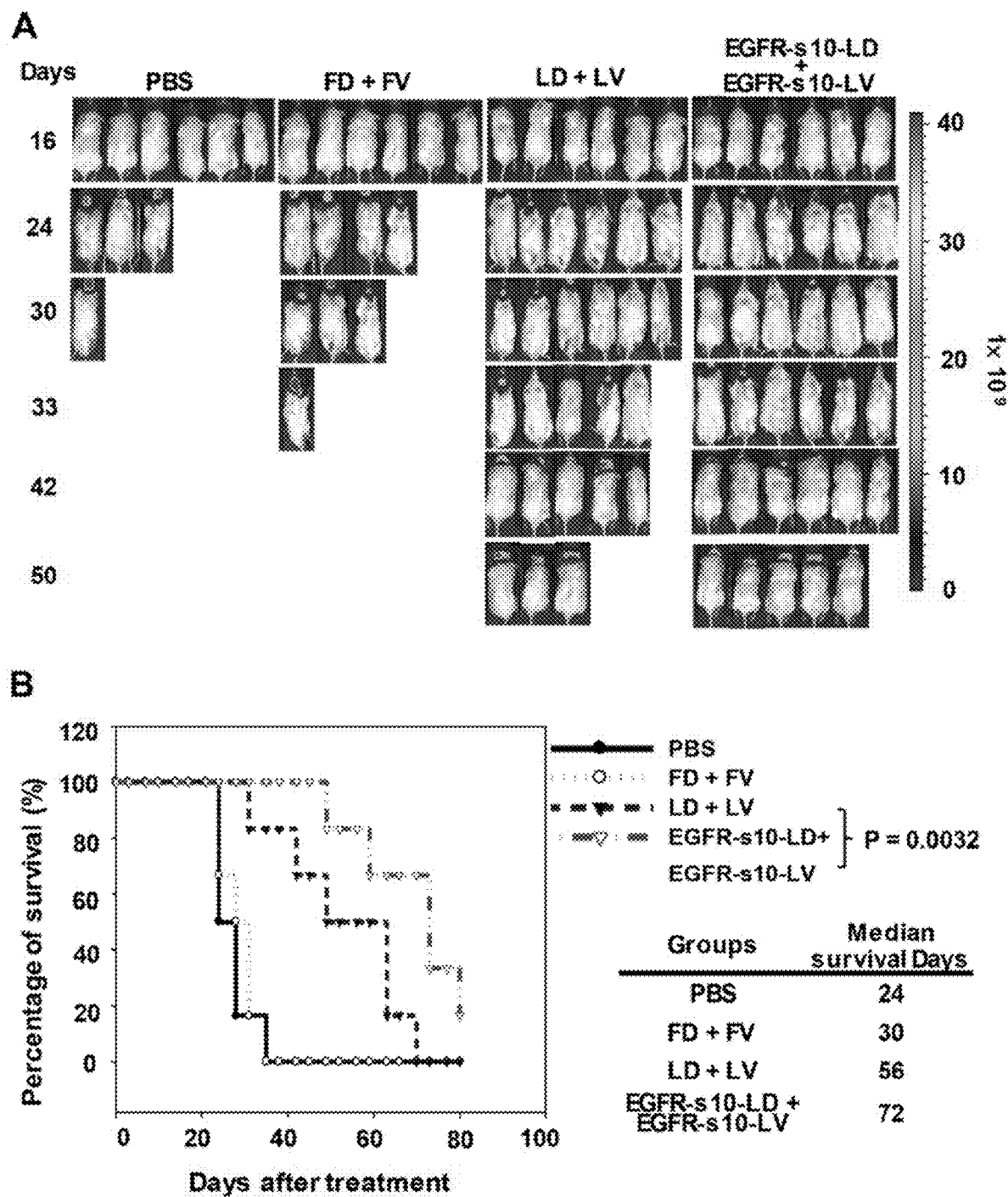
FIG. 6 shows therapeutic efficacy of EGFR-s10-conjugated LTLs in orthotopic human SCCHN xenografts. (A) hi vivo images of SCID mice bearing FaDu-Luc cells. (B) Kaplan-Meier survival curves (left panel) and median survival time of all four groups (right panel). Error bar, SE.

Considering that the subcutaneous microenvironment is not representative of head and neck cancer, we validated the efficacy of LTLs in an orthotopic xenograft model by using FaDu-xenografted NOD/SLID mice. The near-infrared (NIR) fluorescence signal intensity in the tumors was weaker in the LTL-treated group than that in NTL: treated group (FIG. 6A). The median survival time of the LTL group was 1.28-times to that of the NTL group (72 days vs. 56 days: p=0.0032; FIG. 6B, left and right panels). Thus, the EGFR-s10-conjugated liposomal formulation enhanced the therapeutic efficacy of doxorubicin and vinorelbine in both subcutaneous and orthotopic murine models in vivo, conferring superior survival without increasing collateral toxicity.

The present application discloses a EGFR-targeting scFv named EGFR-s10, which comprises a heavy chain variable domain ($V_H$, SEQ ID NO: 7; FIG. 7) and a light chain variable domain ($V_L$, SEQ ID NO: 8; FIG. 8). The $V_H$ comprises $V_H$ CDR1 (SEQ ID NO: 1), V1 CDR2 (SEQ ID NO: 2), and $V_H$ CDR3 (SEQ ID NO: 3). The $V_L$ comprises $V_L$ CDR1 (SEQ ID NO: 4), $V_L$ CDR2 (SEQ ID NO: 5), and $V_L$ CDR3 (SEQ ID NO: 6). The amino acid sequence of the whole EGFR-targeting scFv and the linker connecting the $V_H$ and $V_L$ are disclosed in SEQ ID Nos: 9 and 11, and the DNA sequence disclosed in SEQ ID NO: 10 (FIG. 9).

Discussion

Figure 3:
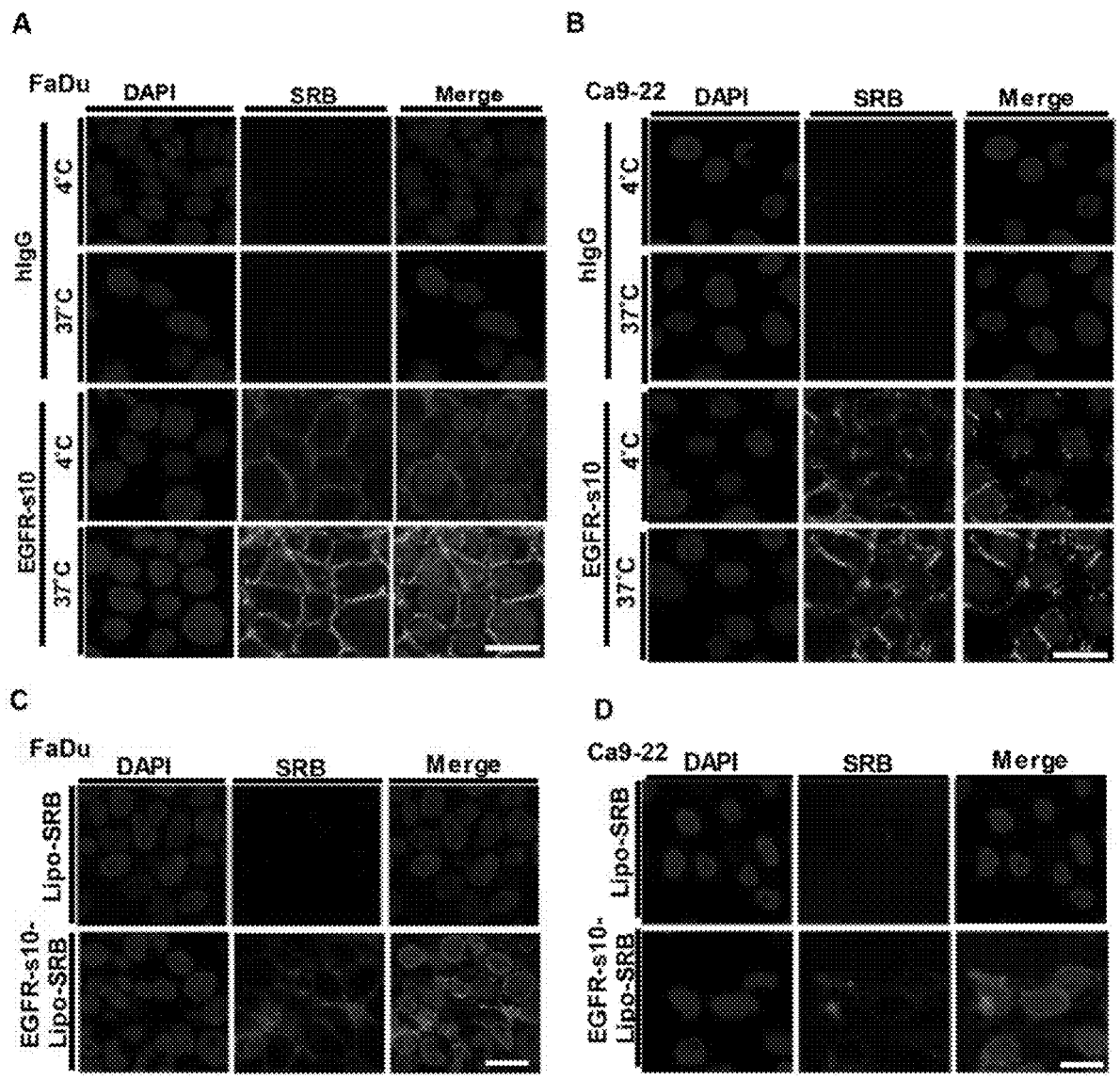
FIG. 3 shows internalization of soluble EGFR-s10 scFv and EGFR-s10-conjugated lipo-SRB evaluated by confocal microscopy. (A-D) Microphotographs showing binding and internalization of EGFR-s10 scFv in FaDu (A) and Ca9-22 (B) cells at 4° C. or 37° C., and internalization of EGFR-s10-conjugated lipo-SRB in FaDu (C) and Ca9-22 (D) cells at 37° C. Scale bar: 25 μm.

Preferential liposomal drug delivery to neoplastic cells can be achieved by ligand-mediated active targeting to prolong tumor retention time and enhance uptake through receptor-mediated endocytosis. This approach involves coupling of a targeting moiety, such as a monoclonal antibody, antibody fragment (e.g., scFv), protein, or carbohydrate to the nanoparticle. Monoclonal antibodies and scFv are the most frequently used targeting ligands because of their high affinity and specificity. It is recognized that scFv offers reduced immunogenicity, improved pharmacokinetics profiles and better tumor penetration. The present application discloses scFv as a targeting moiety for LTLs. To minimize immunogenicity, scFv from a phage library that displays fully human scFv was generated. The data clearly demonstrated preferential retention of the targeting moiety in xenograft tumors (FIG. 2) and increased uptake by cancer cells in its free form and liposome-conjugated form (FIG. 3). In the orthotopic xenograft model (FIG. 6), LTLs reduced the tumor burden and significantly prolonged the survival of tumor-bearing mice even when compared to the NTL-treated group, indicating these novel formulations achieved a higher therapeutic effect with less toxicity simultaneously.

In conclusion, the formulations of LTLs disclosed in the present application substantially reduced the IC50 of chemotherapeutics in both FaDu and Ca9-22 cells in vitro when compared to the NTL counterparts. Moreover, the LTLs drastically suppressed tumor growth in a subcutaneous xenograft model and an orthotopic model. The median survival time of the LTLs-treated group was longer than the NTL-treated group, indicating improved efficacy and decreased toxicity of the payloads. See Wang et al. "Novel anti-EGFR scFv human antibody-conjugated immunoliposomes enhance chemotherapeutic efficacy in squamous cell carcinoma of head and neck. Oral Oncol" 2020 Apr. 21; 106:104689, which is incorporated herein by reference in its entirety.

All references cited and discussed in this specification are incorporated herein by reference in their entireties and to the same extent as if each reference was individually incorporated by reference.

What is claimed is:

1. A ligand targeting to epidermal growth factor receptor (EGFR), comprising:
   (a) a heavy chain variable domain ($V_H$), comprising $V_H$ CDR1, $V_H$ CDR2, and $V_H$ CDR3, wherein the $V_H$ CDR1, $V_H$ CDR2 and $V_H$ CDR3 comprise the amino acid sequences of SEQ ID NO: 1, SEQ ID NO: 2, and SEQ ID NO: 3, respectively; and
   (b) a light chain variable domain ($V_L$), comprising $V_L$ CDR1, $V_L$ CDR2, and $V_L$ CDR3, wherein the $V_L$ CDR1, $V_L$ CDR2, and $V_L$ CDR3 comprise the amino acid sequences of SEQ ID NO: 4, SEQ ID NO: 5, and SEQ ID NO: 6, respectively.

2. The ligand of claim 1, wherein the $V_H$ comprises the amino acid sequence of SEQ ID NO: 7 and the $V_L$ comprises the amino acid sequence of SEQ ID NO: 8.

3. The ligand of claim 1, which comprises the amino acid sequence of SEQ ID NO: 9.

4. The ligand of claim 1, further comprising a peptide linking the $V_H$ to the $V_L$.

5. The ligand of claim 1, wherein the ligand is selected from the group consisting of a single chain variable fragment (scFv), a fusion protein, and a monoclonal antibody or an antigen-binding fragment thereof.

6. A conjugate comprising:
   (a) the ligand of claim 1;
   (b) a liposome, conjugated to the ligand.

7. The conjugate of claim 6, wherein the liposome is conjugated with polyethylene glycol (PEG) forming a PEGylated liposome.

8. The conjugate of claim 7, further comprising at least one chemotherapeutic agent encapsulated within the liposome.

9. The conjugate of claim 8, wherein the at least one chemotherapeutic compound is selected from the group consisting of doxorubicin and vinorelbine.

10. A method for treating an EGFR-expressing tumor in a subject in need thereof, comprising:

administering to the subject in need thereof a therapeutically effective amount of the conjugate of claim 8 to treat the EGFR-expressing tumor in the subject in need thereof.

11. A method for treating squamous cell carcinoma in a subject in need thereof, comprising:
administering to the subject in need thereof a therapeutically effective amount of the conjugate of claim 8 to treat the squamous cell carcinoma in the subject in need thereof.

12. An expression vector, a phage, or a cell, comprising and/or expressing the ligand of claim 1.

13. The ligand of claim 1, wherein the ligand is a scFv with the $V_H$ located at N-terminal to the $V_L$ and linked to the $V_L$ via a linker peptide.

14. A method of making a ligand targeting liposomal drug, comprising:
(a) affording a PEGylated liposome;
(b) encapsulating at least one chemotherapeutic agent within the PEGylated liposome to obtain a PEGylated liposomal drug;
(c) reducing the ligand of claim 1 to obtain a reduced ligand;
(d) inserting a PEGylation reagent with a 1,2-Distearoyl-sn-glycero-3-phosphorylethanolamine (DSPE) phospholipid and a maleimide into the PEGylated liposomal drug to afford a maleimide-PEG-DSPE-inserting liposomal drug;
(e) conjugating the reduced ligand to the maleimide-PEG-DSPE-inserting liposomal drug to obtain the ligand targeting liposomal drug.

15. A conjugate comprising:
(a) the ligand of claim 2;
(b) a liposome, conjugated to the ligand.

16. A conjugate comprising:
(a) the ligand of claim 3;
(b) a liposome, conjugated to the ligand.

17. A conjugate comprising:
(a) the ligand of claim 4;
(b) a liposome, conjugated to the ligand.

18. A conjugate comprising:
(a) the ligand of claim 5;
(b) a liposome, conjugated to the ligand.

19. The conjugate of claim 18, wherein the liposome is conjugated with polyethylene glycol (PEG) forming a PEGylated liposome.

20. A method for treating a tumor in a subject in need thereof, comprising:
administering to the subject in need thereof a therapeutically effective amount of the conjugate of claim 9 to treat the tumor in the subject in need thereof, wherein the tumor is an EGFR-expressing tumor or squamous cell carcinoma.

\* \* \* \* \*

SEQUENCE LISTING

```
<160> NUMBER OF SEQ ID NOS: 11

<210> SEQ ID NO 1
<211> LENGTH: 8
<212> TYPE: PRT
<213> ORGANISM: Artificial Sequence
<220> FEATURE:
<223> OTHER INFORMATION: Heavy chain variable domain CDR1

<400> SEQUENCE: 1

Ala Ala Ser Gly Phe Asn Leu Ser
1               5

<210> SEQ ID NO 2
<211> LENGTH: 9
<212> TYPE: PRT
<213> ORGANISM: Artificial Sequence
<220> FEATURE:
<223> OTHER INFORMATION: Heavy chain variable domain CDR2

<400> SEQUENCE: 2

Glu Trp Val Ala Asn Ile Asn His Asp
1               5

<210> SEQ ID NO 3
<211> LENGTH: 14
<212> TYPE: PRT
<213> ORGANISM: Artificial Sequence
<220> FEATURE:
<223> OTHER INFORMATION: Heavy chain variable domain CDR3

<400> SEQUENCE: 3
```

Ala Lys Gly Lys Ser Leu Tyr Asp Gly Ser Ala Leu Asp Met
1               5                   10

<210> SEQ ID NO 4
<211> LENGTH: 6
<212> TYPE: PRT
<213> ORGANISM: Artificial Sequence
<220> FEATURE:
<223> OTHER INFORMATION: Light chain variable domain CDR1

<400> SEQUENCE: 4

Arg Ala Ser Gln Thr Ile
1               5

<210> SEQ ID NO 5
<211> LENGTH: 7
<212> TYPE: PRT
<213> ORGANISM: Artificial Sequence
<220> FEATURE:
<223> OTHER INFORMATION: Light chain variable domain CDR2

<400> SEQUENCE: 5

Lys Leu Leu Ile Tyr Gly Ala
1               5

<210> SEQ ID NO 6
<211> LENGTH: 9
<212> TYPE: PRT
<213> ORGANISM: Artificial Sequence
<220> FEATURE:
<223> OTHER INFORMATION: Light chain variable domain CDR3

<400> SEQUENCE: 6

Gln Gln Ser Tyr Ser Thr Leu Trp Thr
1               5

<210> SEQ ID NO 7
<211> LENGTH: 120
<212> TYPE: PRT
<213> ORGANISM: Artificial Sequence
<220> FEATURE:
<223> OTHER INFORMATION: heavy chain variable domain

<400> SEQUENCE: 7

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Leu Ser Ser Phe
                20                  25                  30

Trp Met Ser Trp Val Arg Gln Ala Pro Gly Lys Gly Leu Glu Trp Val
            35                  40                  45

Ala Asn Ile Asn His Asp Gly Ser Asp Lys Tyr Tyr Val Asp Ser Val
        50                  55                  60

Lys Gly Arg Phe Ser Ile Ser Arg Asp Asn Thr Lys Asn Ser Val Tyr
65                  70                  75                  80

Leu Gln Met Asp Ser Leu Arg Gly Glu Asp Thr Ala Val Tyr Tyr Cys
                85                  90                  95

Ala Lys Gly Lys Ser Leu Tyr Asp Gly Ser Ala Leu Asp Met Trp Gly
            100                 105                 110

Gln Gly Thr Met Val Thr Val Ser
        115                 120

<210> SEQ ID NO 8
<211> LENGTH: 108

<212> TYPE: PRT
<213> ORGANISM: Artificial Sequence
<220> FEATURE:
<223> OTHER INFORMATION: light chain variable domain

<400> SEQUENCE: 8

```
Asp Ile Val Met Thr Gln Ser Pro Ser Thr Leu Ser Ala Ser Val Gly
1               5                   10                  15

Asp Arg Val Thr Ile Thr Cys Arg Ala Ser Gln Thr Ile Gly Arg Trp
            20                  25                  30

Leu Ala Trp Tyr Gln Gln Lys Pro Gly Lys Ala Pro Lys Leu Leu Ile
        35                  40                  45

Tyr Gly Ala Ser Ser Leu Gln Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Leu Trp
            85                  90                  95

Thr Phe Gly Gln Gly Thr Lys Leu Glu Ile Lys Arg
            100                 105
```

<210> SEQ ID NO 9
<211> LENGTH: 244
<212> TYPE: PRT
<213> ORGANISM: Artificial Sequence
<220> FEATURE:
<223> OTHER INFORMATION: Whole scFv

<400> SEQUENCE: 9

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Leu Ser Ser Phe
            20                  25                  30

Trp Met Ser Trp Val Arg Gln Ala Pro Gly Lys Gly Leu Glu Trp Val
        35                  40                  45

Ala Asn Ile Asn His Asp Gly Ser Asp Lys Tyr Tyr Val Asp Ser Val
50                  55                  60

Lys Gly Arg Phe Ser Ile Ser Arg Asp Asn Thr Lys Asn Ser Val Tyr
65                  70                  75                  80

Leu Gln Met Asp Ser Leu Arg Gly Glu Asp Thr Ala Val Tyr Tyr Cys
            85                  90                  95

Ala Lys Gly Lys Ser Leu Tyr Asp Gly Ser Ala Leu Asp Met Trp Gly
            100                 105                 110

Gln Gly Thr Met Val Thr Val Ser Ser Gly Gly Gly Ser Gly Gly
            115                 120                 125

Gly Gly Ser Gly Gly Gly Ser Asp Ile Val Met Thr Gln Ser Pro
    130                 135                 140

Ser Thr Leu Ser Ala Ser Val Gly Asp Arg Val Thr Ile Thr Cys Arg
145                 150                 155                 160

Ala Ser Gln Thr Ile Gly Arg Trp Leu Ala Trp Tyr Gln Gln Lys Pro
            165                 170                 175

Gly Lys Ala Pro Lys Leu Leu Ile Tyr Gly Ala Ser Ser Leu Gln Ser
            180                 185                 190

Gly Val Pro Ser Arg Phe Ser Gly Ser Gly Ser Gly Thr Asp Phe Thr
            195                 200                 205

Leu Thr Ile Ser Ser Leu Gln Pro Glu Asp Phe Ala Thr Tyr Tyr Cys
        210                 215                 220
```

```
Gln Gln Ser Tyr Ser Thr Leu Trp Thr Phe Gly Gln Gly Thr Lys Leu
225                 230                 235                 240

Glu Ile Lys Arg

<210> SEQ ID NO 10
<211> LENGTH: 732
<212> TYPE: DNA
<213> ORGANISM: Artificial Sequence
<220> FEATURE:
<223> OTHER INFORMATION: Whole scFv DNA sequence

<400> SEQUENCE: 10
gaggtgcagc tggtggagtc tgggggaggc ttggtccagc ctgggggtc  cctgagactc    60 tcctgtgcag cctctggatt taaccttagt agcttttgga tgagttgggt ccgccaggct   120
ccagggaagg ggctggagtg ggtggccaac ataaaccacg atggaagtga caagtactat   180
gtggactctg tgaagggccg attcagcatc tccagagaca caccaagaa ttcagtgtat    240 ctgcaaatgg acagcctgag aggcgaggac acggctgtgt attactgtgc gaaaggtaaa   300
tcgctgtatg acggcagcgc tcttgatatg tggggccaag gacaatggt caccgtctct    360 tcaggtggag gcggttcagg cggaggtggc tctggcggtg gcggatcgga catcgtgatg   420
acccagtctc cttccaccct gtctgcatct gtaggagaca gagtcaccat cacttgccgg   480
gccagtcaga ctattggtag gtggttagcc tggtatcagc agaaaccagg aaagcccct    540 aagctcctga tctatggtgc atcgagtttg caaagtgggg tcccatcaag gttcagtggc   600
agtggatctg ggacagattt cactctcacc atcagcagtc tgcaacctga agattttgca   660
acttactact gtcaacagag ttacagtacc ctgtggacct tcggccaagg gaccaagctg   720
gagatcaaac gt                                                      732

<210> SEQ ID NO 11
<211> LENGTH: 15
<212> TYPE: PRT
<213> ORGANISM: Artificial Sequence
<220> FEATURE:
<223> OTHER INFORMATION: a linker within the scFv

<400> SEQUENCE: 11

Gly Gly Gly Gly Ser Gly Gly Gly Gly Ser Gly Gly Gly Gly Ser
1               5                   10                  15
```